United States Patent [19]

Shinagawa

[11] Patent Number: 5,315,313
[45] Date of Patent: May 24, 1994

[54] DEVICE FOR ELECTING A FIGURE FROM AMONG FIGURES DEPICTED ON A DISPLAY DEVICE

[75] Inventor: Tomonori Shinagawa, Tokyo, Japan

[73] Assignee: Matsushita Electric Industrial Co., Ltd., Kadoma, Japan

[21] Appl. No.: 909,004

[22] Filed: Jul. 6, 1992

[30] Foreign Application Priority Data

Jul. 24, 1991 [JP] Japan .................................. 3-184412

[51] Int. Cl.$^5$ .............................................. G09G 3/02
[52] U.S. Cl. .................................... 345/145; 345/157; 395/900
[58] Field of Search ............... 340/706, 709, 710, 723, 340/724, 728, 747; 395/900, 159, 156, 157, 155; 345/145, 146, 157, 902

[56] References Cited

U.S. PATENT DOCUMENTS

| | | | |
|---|---|---|---|
| 4,698,625 | 10/1987 | McCaskill et al. | 340/709 |
| 4,725,829 | 2/1988 | Murphy | 340/709 |
| 4,984,152 | 1/1991 | Muller | 340/709 |
| 4,987,527 | 1/1991 | Hamada et al. | 340/709 |
| 5,027,291 | 6/1991 | Callahan et al. | 340/709 |
| 5,084,754 | 1/1992 | Tomitaka | 395/900 |
| 5,168,549 | 12/1992 | Takagi et al. | 395/900 |
| 5,179,625 | 1/1993 | Hisano | 395/900 |
| 5,189,728 | 2/1993 | Yamakawa et al. | 395/900 |

OTHER PUBLICATIONS

Taber et al, "Estimation of Expert Weights Using Fuzzy Cognitive Maps," IEEE 1st. Inter. Conf. on Neural. Networks, Jun. 21-24, 1987.
Schwartz, Daniel, "Fuzzy logic flowers in Japan," IEEE, Jul. 1992.

Primary Examiner—Tommy P. Chin
Assistant Examiner—A. Au
Attorney, Agent, or Firm—Spencer, Frank & Schneider

[57] ABSTRACT

A figure electing device permits an operator to use a pointing device such as a mouse to elect a figure from among one or more figures located in the vicinity of a point that is indicated on a figure display image plane by the pointing device, so that the elected figure can be subjected to figure processing. The figure electing device computes the possibility of being elected for every figure by fuzzy inference based on fuzzy rules, and determines the figure designated by the pointing device based on the possibilities allocated to positions relative to the point designated by the pointing device.

12 Claims, 16 Drawing Sheets

INDICATED POINT

MOUSE CURSOR

| 0 | 0.2 | 0.6 | 0.5 | 0.2 | 0 |
|---|---|---|---|---|---|
| 0.2 | 0.8 | 0.8 | 0.7 | 0.5 | 0.2 |
| 0.6 | 0.8 | 1.0 | 1.0 | 0.4 | 0.3 |
| 0.5 | 0.7 | 1.0 | 0.8 | 0.3 | 0.2 |
| 0.2 | 0.5 | 0.4 | 0.3 | 0.3 | 0 |
| 0 | 0.2 | 0.3 | 0.2 | 0 | 0 |

EXAMPLE 1 OF MOUSE CURSOR

EXAMPLE 2 OF MOUSE CURSOR

EXAMPLE 3 OF MOUSE CURSOR

DEVICE FOR ELECTING A FIGURE FROM AMONG FIGURES DEPICTED ON A DISPLAY DEVICE

BACKGROUND OF THE INVENTION

1. Field of the Invention

The present invention relates to a figure electing device used in a figure processor, and particularly to a figure electing device for designating a desired figure from among those figures that are displayed on a figure processing image plane in accordance with a pointer.

2. Description of the Related Arts

A conventional figure electing device, as shown in FIG. 14, is composed of coordinates detecting means 1 for receiving position information on an image plane of a point on a figure processing image plane indicated by a pointer and computing the coordinates of that point, figure detecting means 2 for detecting figures located in the vicinity of the computed coordinates and figure determining means 3 for electing a desired figure out of detected nearby figures, and is used by being connected to figure processing equipment 4 for processing figures using the figure processing image plane.

When a pointing device such as a mouse indicates a specific position on a figure processing image plane, a conventional figure electing device receives a position information on the image plane of the indicated point and designates the figure closest to the indicated point. The figure processing equipment 4 performs figure processing such as editing of the figure designated as described above using the figure processing image plane.

The operation of a typical conventional figure electing device will be described in further detail by reference to the flow chart shown in FIG. 15, an example of a display on a figure processing image plane as shown in FIG. 16, and a particularly enlarged diagram thereof shown in FIG. 17 along with FIGS. 18A-18C and FIG. 19.

FIG. 16 illustrates an example of various types of figures which can be objects of figure processing. A user moves a pointer such as an arrow mark, a finger or crossed lines displayed on a figure processing image plane as illustrated in FIGS. 18A through 18C, onto or nearby a figure to be processed by a pointing device such as a mouse, a track ball and so on. When a point is indicated by clicking a button, pushing a key or so on at an appropriate position, the pointing device provides position information in an image plane of the indicated point.

The coordinates detecting means 1 receives the position information in the image plane, and computes and outputs the coordinates of the indicated point (step A1).

The figure detecting means 2 receives the coordinates computed by the coordinates detecting means 1, sets a circle having a fixed radius with the coordinates of the indicated point as the center as shown in FIG. 17 (which shows the vicinity of the indicated point on an enlarged scale), and detects all of the figures included partially or entirely within the circle (step A2). For easy and rapid detection, an improved method is disclosed in JP-A-2-110777, which uses preset rectangules circumscribing the drawn figures, and another method is disclosed in JP-A-2-275574, which uses a table listing figure locations classified based on specific dots to be searched according to a pointed location on the screen. When any figure exists in the vicinity of the indicated point, processing proceeds to step A3, and when no figure exists, the processing routine is ended.

In the step A3, the figure determining means 3 elects the figure located closest to the indicated point out of the nearby figures detected by the figure detecting means 2. Information on the figure thus elected is provided to the figure processing equipment 4, and figure processing such as editing can begin.

However, the above-described conventional figure electing device has the problem that the device sometimes designates a different figure from the one intended by the user because the user may be confused if a pointer having directivity, such as an arrow mark (FIG. 18A). Further, or a finger (FIG. 18B), is used to designate a distant figure in a specific direction if a figure which overlaps other figures as shown in FIG. 19 is designated, the uppermost figure is designated preferentially, and the desired figure cannot be designated.

SUMMARY OF THE INVENTION

It is an object of the present invention to solve such problems of the prior art and to provide a figure electing device which is not affected by the shape of a pointer displayed on a figure processing image plane, and which is also able to designate exactly a desired figure even in case figures overlap one another.

A figure electing device according to the present invention is used together with a pointing device and a figure display image plane. The figure electing device is provided with coordinates detecting means for receiving information on a point indicated on the figure display image plane by the pointing device and computing the coordinates of the indicated point, figure detecting means for detecting figures located in the vicinity of the indicated point and providing information on those figures, and figure determining means for receiving the information on those figures, determining the figure which the pointing device is going to designate on the figure display image plane and providing information on that figure. The figure elective device is further provided with criteria providing means for holding and providing information on the possibility to elect one specific figure at a position computed by fuzzy inference based on fuzzy rules for determining one figure and determined depending upon a relative position with respect to the coordinates of the indicated point. When there are a plurality of figures detected by the above-described figure detecting means, the above-described determining means receives information on the possibilities and determines the figure located at the position of the highest possibility to be the designated figure.

The criteria providing means may include fuzzy rule holding means for holding fuzzy rules for determining figures, and determination assisting means for computing the possibility for every figure by fuzzy inference based on the fuzzy rules when there are a plurality of figures detected by the figure detecting means and supplying the possibility for every figure to the above-described figure determining means. The figure determining means determines the figure that is designated based on the possibilities it receives.

Furthermore, the criteria providing means may include fuzzy rule holding means for holding fuzzy rules for determining figures, rule map generating means for computing and supplying a rule map by fuzzy inference based on the fuzzy rules provided by the fuzzy rule holding means, and rule map holding means for holding the rule map in an accessible configuration, wherein, if there are a plurality of figures detected by the figure detecting means, the figure determining means refers to the rule map held in the rule map holding means and determines the figure that is designated based on the rule map.

Moreover, the criteria providing means may include fuzzy rule holding means for holding fuzzy rules for determining a figure, rule box generating means for computing and supplying rule boxes by fuzzy inference based on the fuzzy rules supplied from the fuzzy rule holding means and rule box holding means for holding a rule box in an accessible configuration, wherein, if there are a plurality of figures detected by the figure detecting means, the above-described figure determining means refers to the rule box held in the rule box holding means and determines the figure that is designated based on the rule box.

Thus, according to the present invention, the determination assisting means draws fuzzy inferences based on the fuzzy rules and computes the possibility of being elected for every figure, and the figure determining means designates one figure based on its possibility. Since a figure is elected based on fuzzy inference as described above, it is possible to correctly designate a figure suited to the user's purpose.

Further, according to one aspect of the invention, a rule map generating means may be employed in order to two-dimensionally applys the fuzzy rules to the figures so as to utilize them for figure election. Accordingly, it becomes possible to accurately designate the figure intended by a user by setting election possibilities fitted to the directivity of the shape of the pointer.

Furthermore, according to another aspect of the invention, the rule map generating means may be employed in order to three-dimensionally apply the fuzzy rules to the figures so as to utilize them for figure election. Accordingly, it becomes possible to accurately designate the figure intended by a user from among overlapping figures while taking directivity of the pointer into account.

DESCRIPTION OF THE PREFERRED EMBODIMENTS

Figure 1:
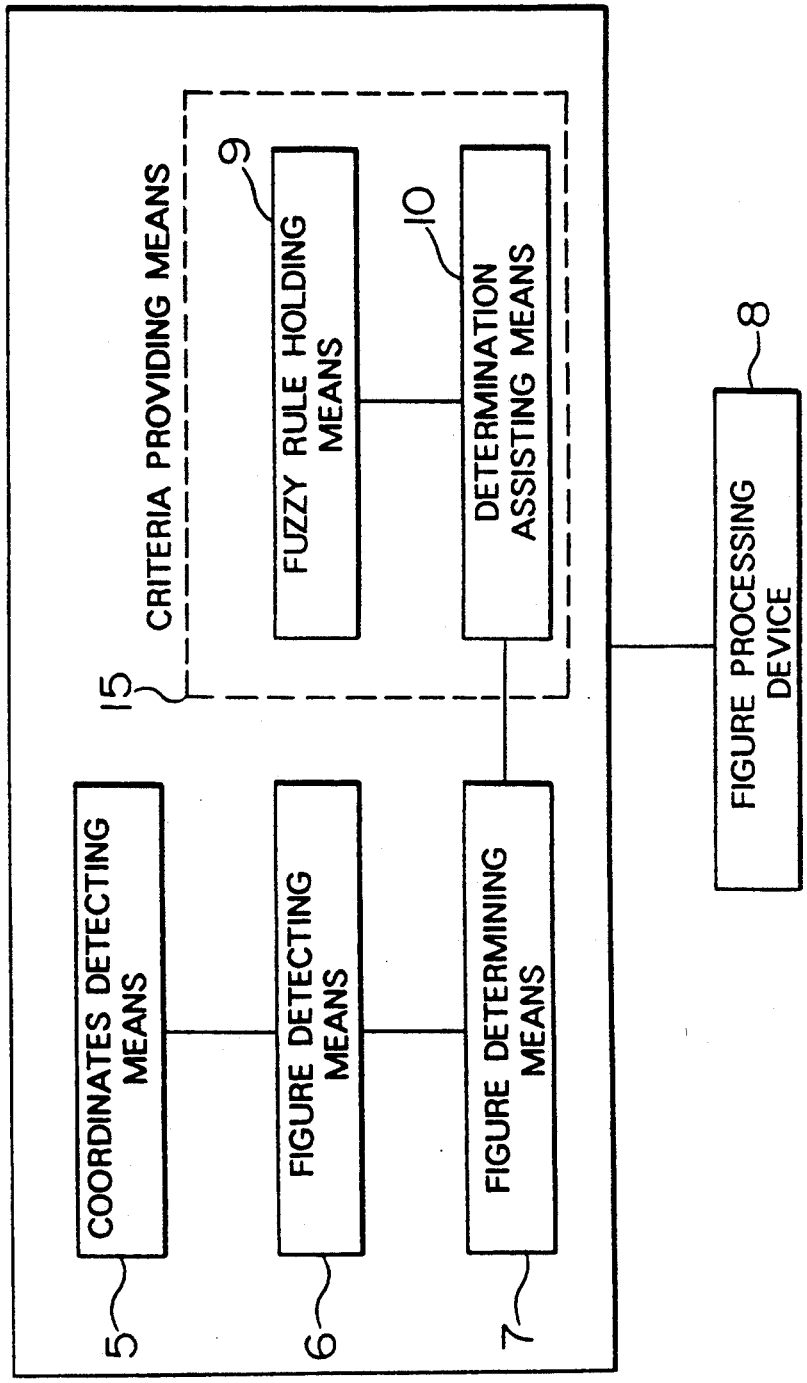
FIG. 1 is a block diagram showing a first embodiment of a figure electing device in accordance with the present invention.

FIG. 1 is a block diagram showing a first embodiment of a figure electing device according to the present invention. In FIG. 1, reference numerals 5 to 8 respectively represent coordinates detecting means, figure detecting means, figure determining means and a figure processing device, which are the same as or correspond to those in a conventional device. Reference numeral 9 represents fuzzy rule holding means for holding fuzzy rules in the form of "if-then" with respect to a positional relationship with an indicated point of a mouse cursor as a center. Reference numeral 10 represents determination assisting means which is connected to the fuzzy rule holding means 9 and the figure determining means 7, draws fuzzy inferences based on fuzzy rules provided by the fuzzy rule holding means 9, and computes an election possibility with respect to every figure so as to provide the possibilities to the figure determining means 7 for figure election. The fuzzy rule holding means 9 and the determination assisting means 10 constitute criteria providing means 15.

Figure 2:
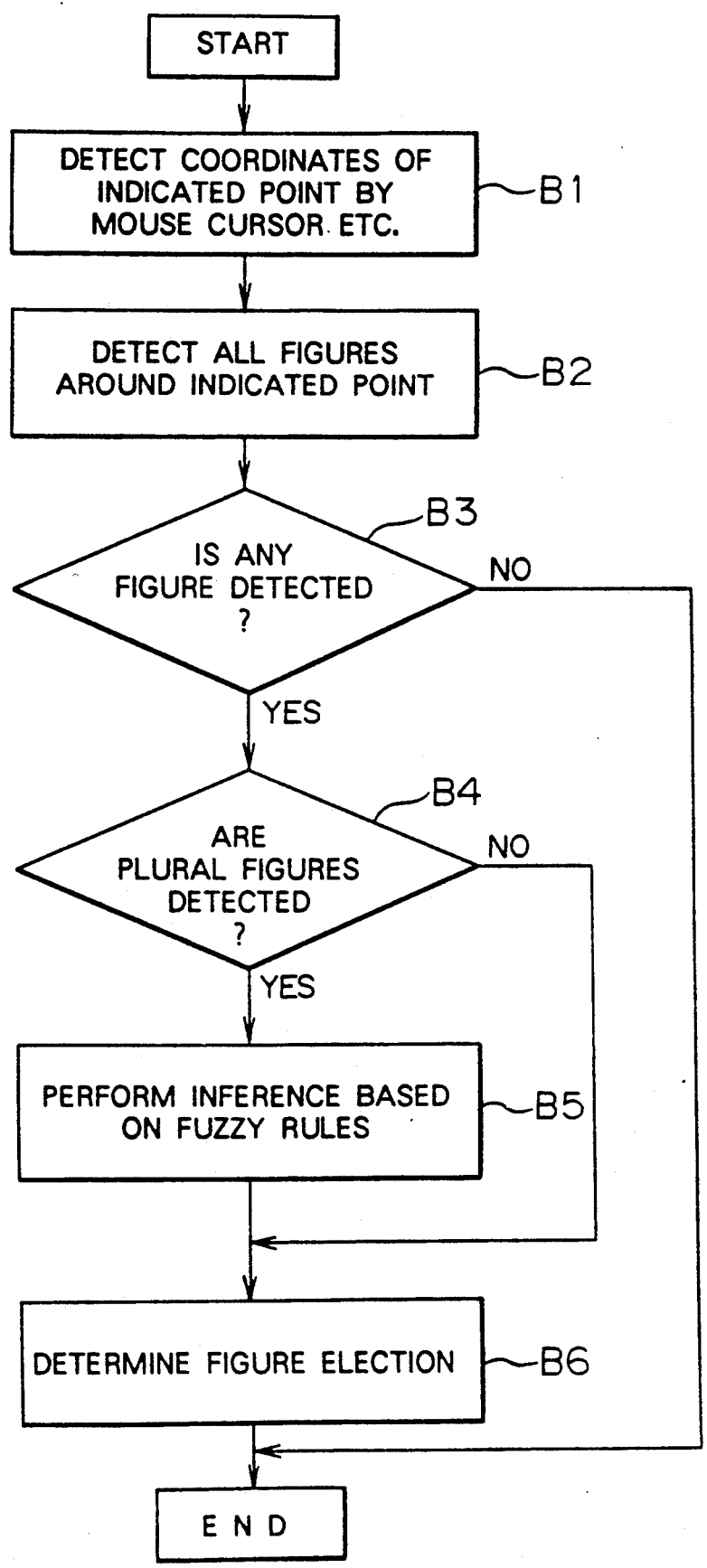
FIG. 2 is a flow chart showing the operation of the first embodiment.
Figure 3:
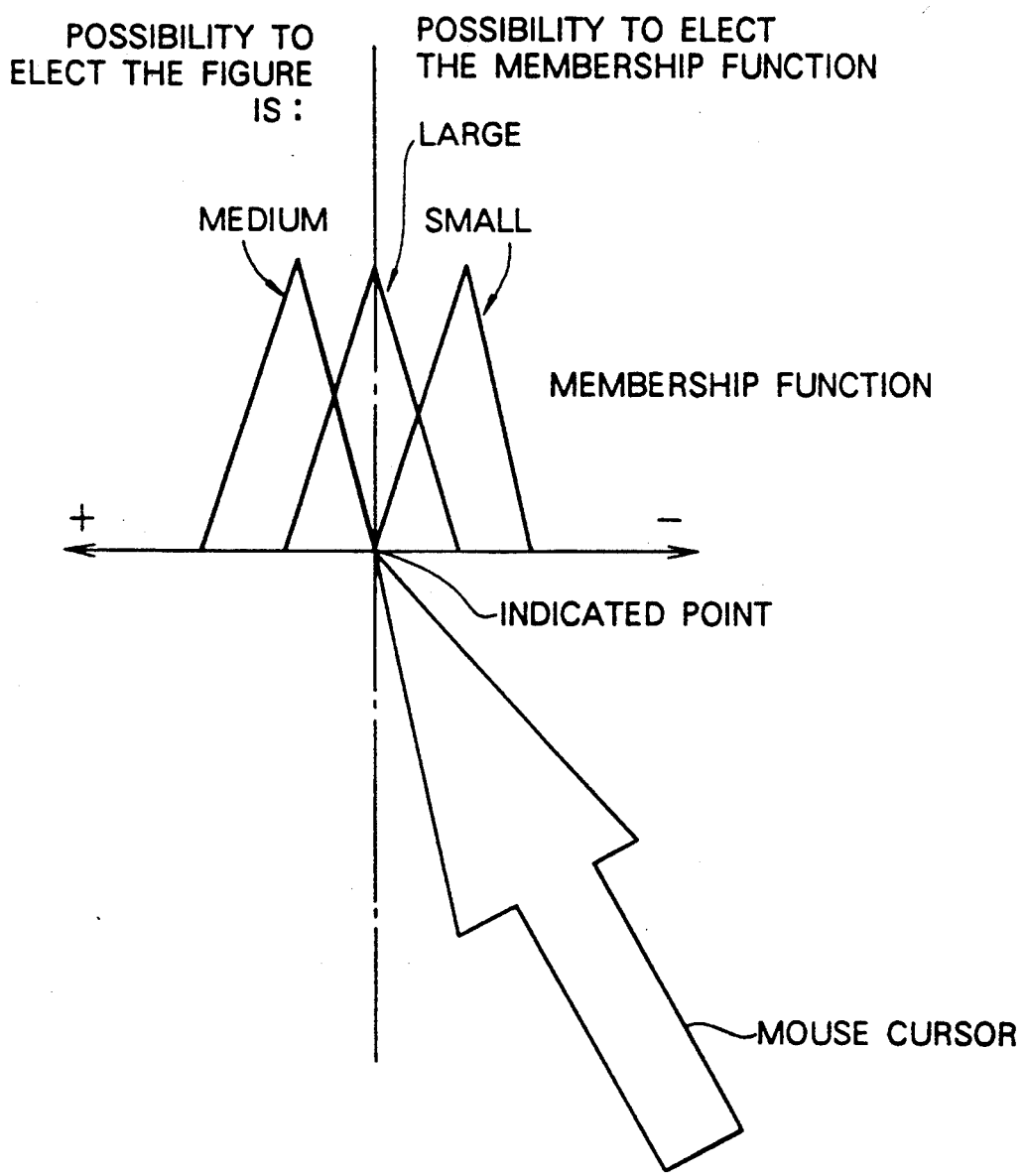
FIG. 3 is an explanatory diagram showing fuzzy rules in the first embodiment.

The operation of the embodiment described above will be explained with reference to the flow chart shown in FIG. 2. In step B1, the coordinates detecting means 5 computes the coordinates of a specific image plane position in a figure processing image plane, the image plane portion being indicated by a pointing device such as a mouse. For example, the position of the point indicated by a mouse cursor may be read by clicking a button, in a manner similar to the conventional example discussed previously. In step B2, the figure detecting means 6 detects all of the figures in the figure processing image plane that are partially or entirely included in a circle whose center is at the coordinates of the position in the image plane computed by the coordinates detecting means 5. Furthermore, in step B3, a check is made to determine whether a figure was detected or not in step B2, and the operation of the present device is ended if no figure was detected. When a figure is detected, the processing proceeds to step B4. In step B4, if a single figure is detected, the figure determining means 7 elects that figure, thus ending the operation of the present device. When if there are a plurality of figures, fuzzy inferences are drawn in the determination assisting means 10 based on fuzzy rules in step B5, and an election possibility with respect to every figure is computed. These fuzzy rules are held by the fuzzy rule holding means 9 in a form of "if-then~" with respect to the positional relationship with the point indicated by the mouse cursor as shown in FIG. 3. In the example shown in FIG. 3, three rules are illustrates in the form of a membership function. One of these rules is "if (the distance between the point and the indicated point is in the vicinity of zero) - then (the possibility for the point to be elected is large)". Another of the rules is "if (the point is apart from the indicated point in a plus direction) - then (the possibility for the point to be elected is medium)". The third rule is "if (the point is apart from the indicated point in a minus direction) - then (the probability for the point to be elected is small))." The of abscissas or horizontal axis represents positions relative to the indicated point, and the ordinate or vertical axis represents the possibility that respective rules are elected when the indicated point exists at a corresponding position on the abscissas. The possibility that a figure located at a certain position relative to the indicated point is the exact figure elected by the pointer may be obtained by adding all those obtained by multiplying the possibility that a respective rule is elected by the possibility that the figure is the elected one according to the respective rule. In step B6, the figure determining means 7 designates the figure which includes the point of the highest possibility to be elected from among those figures that are located in the vicinity of the indicated point, by referring to possibility information with respect to respective points held by the determination assisting means 10. This ends the operation of the present device. In the example shown in FIG. 3, the figures located to the left of the indicated point are elected preferentially. Thus, it becomes possible to perform more accurate election of the figures desired by the user by using fuzzy rules.

Figure 4:
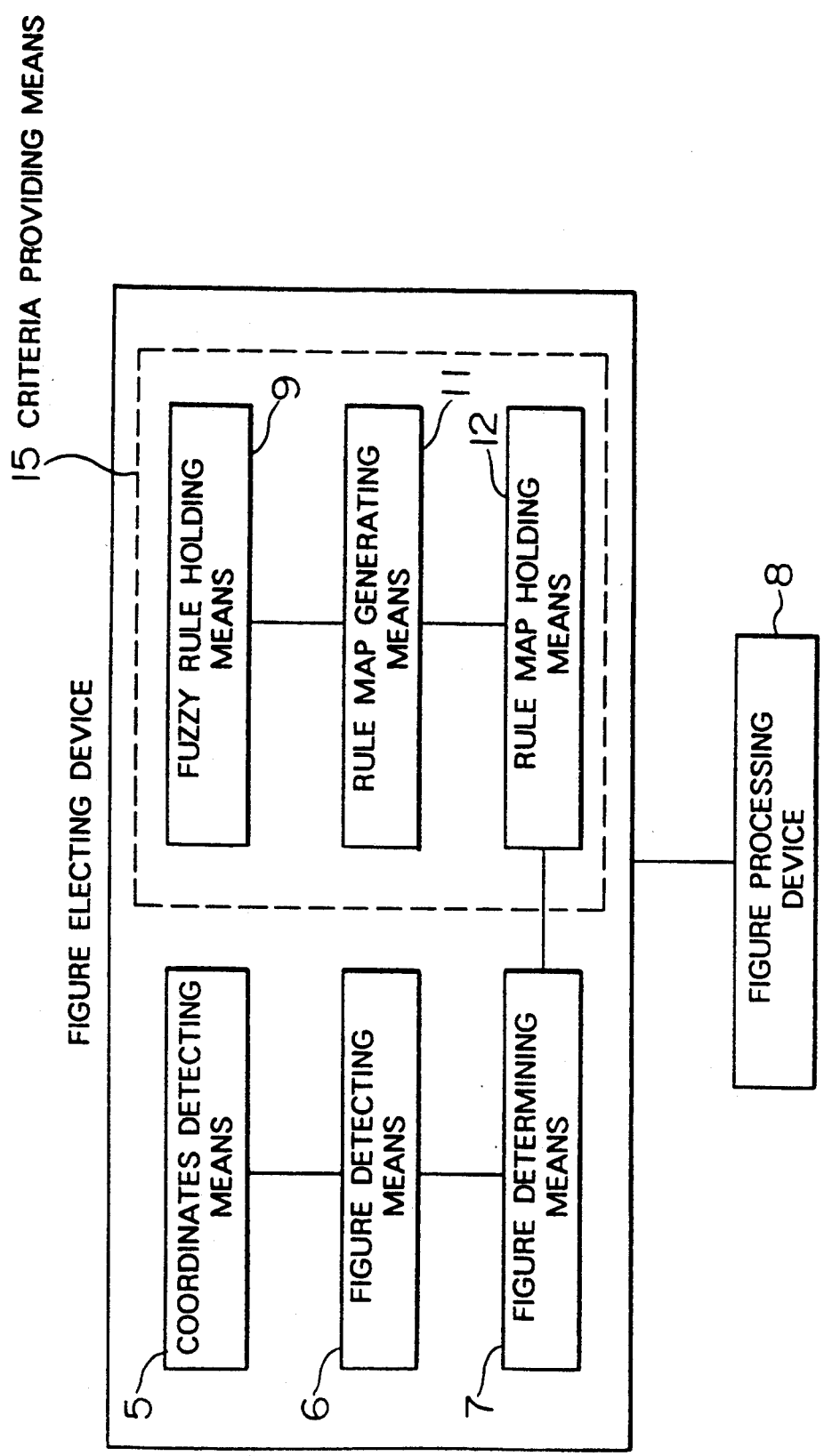
FIG. 4 is a block diagram showing a second embodiment of a figure electing device in accordance with the present invention.
Figure 6:
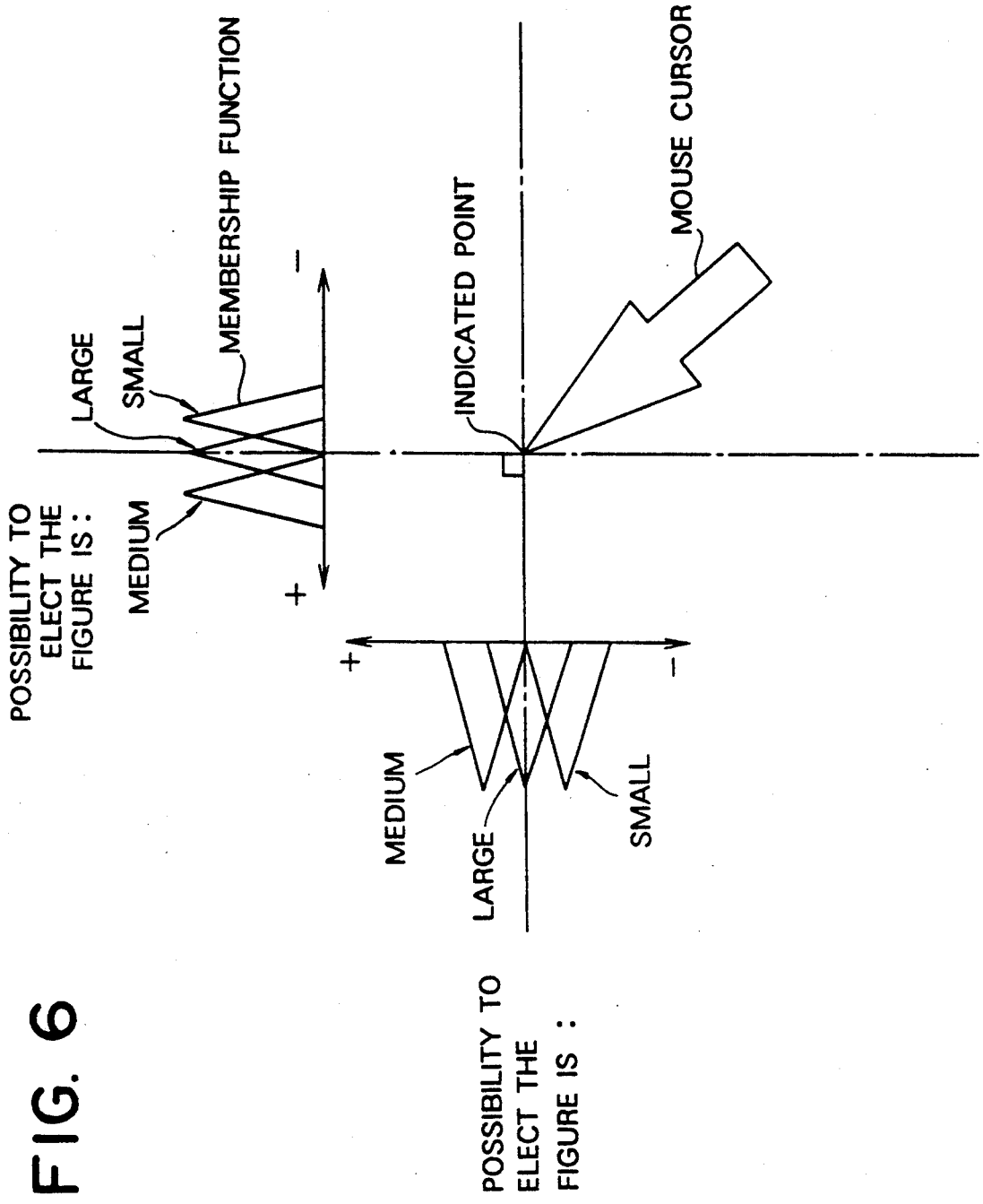
FIG. 6 is an explanatory diagram showing fuzzy rules in the second embodiment.
Figure 18A:
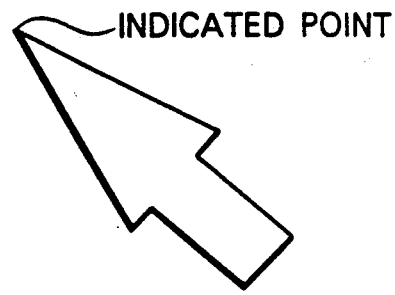
FIG. 18A is an explanatory diagram for illustrating a pointer having an arrow shape.
Figure 18B:
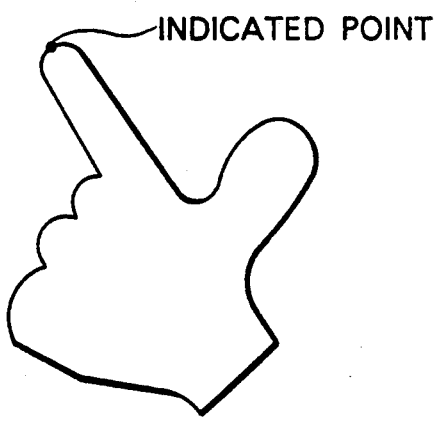
FIG. 18B is a diagram showing a pointer having a finger shape.
Figure 18C:
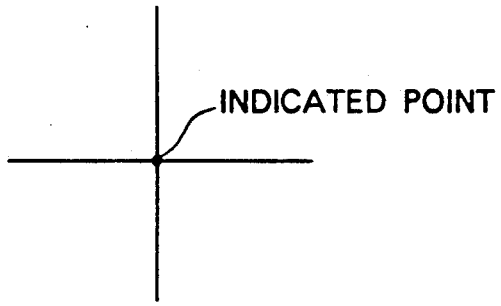
FIG. 18C is a diagram showing a cross pointer.

FIG. 4 is a block diagram showing a second embodiment of the figure electing device of the present invention. In FIG. 4, reference numerals 5 to 9 respectively represent coordinates detecting means, figure detecting means, figure determining means, a figure processing device and fuzzy rule holding means. These components are the same as those in the first embodiment, and the description thereof is omitted herein. Reference number 11 represents rule a map generating means which is connected to the fuzzy rule holding means 9 and a rule map holding means 12, and which generates rule maps consisting of election possibility information (numeral values between 0 to 1) from the fuzzy rules held by the fuzzy rule holding means 9. The rule map holding means 12 is connected to the rule map generating means 11 and to the figure determining means 7 and holds the shape of the mouse cursor and the rule maps associated with respective mouse cursors. Here, the fuzzy rule holding means 9 holds several fuzzy rules in the form of "if-then~" with respect to the positional relationship with the point indicated by the mouse cursor as shown in FIG. 6. In the example shown in FIG. 6, conditions are set with respect to a two-dimensional plane with the indicated point as the center, and three rules are provided. The first rule is "if (the distance between the point and the indicated point is in the vicinity of zero) - then (the possibility for the point to be elected is large)". The second rule is "if (the point is separated from the indicated point in the plus direction) - then (the possibility for the point to be elected is medium)". The third rule is "if (the point is separated from the indicated point in the minus direction) - then (the possibility for the point to be elected is small)." In this manner, it is possible to increase the possibility of electing figures located in the direction that an arrow mark is pointing, and to reduce the possibility of electing intended figures, when the shape of the mouse cursor is an arrow mark. Further, in the case of a pointer having a finger shape (FIG. 18B), it is possible to employ reduced weighting depending on directions, and furthermore, in the case of a cross cursor (FIG. 18C), it is possible to arrange for no difference to be provided between respective directions.

Figure 5:
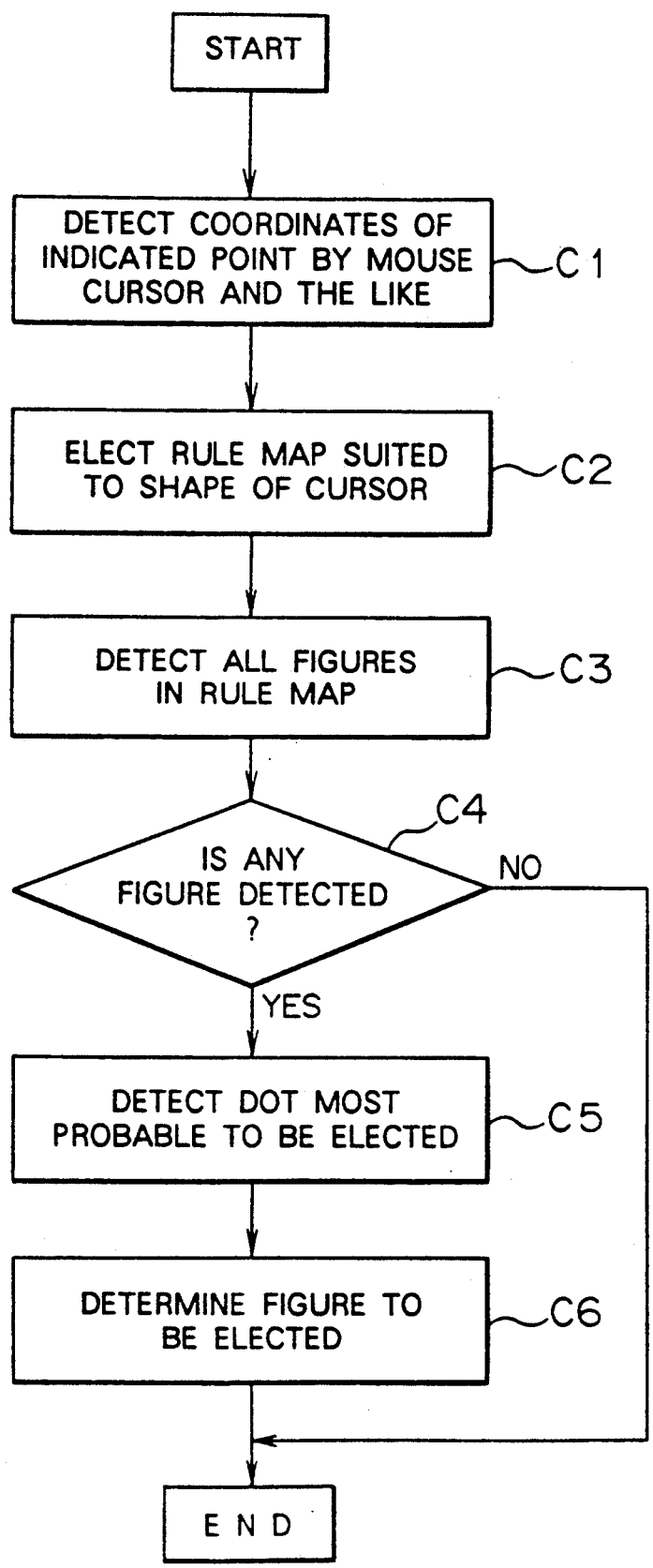
FIG. 5 is a flow chart showing the operation of the second embodiment.
Figures 7, 8:
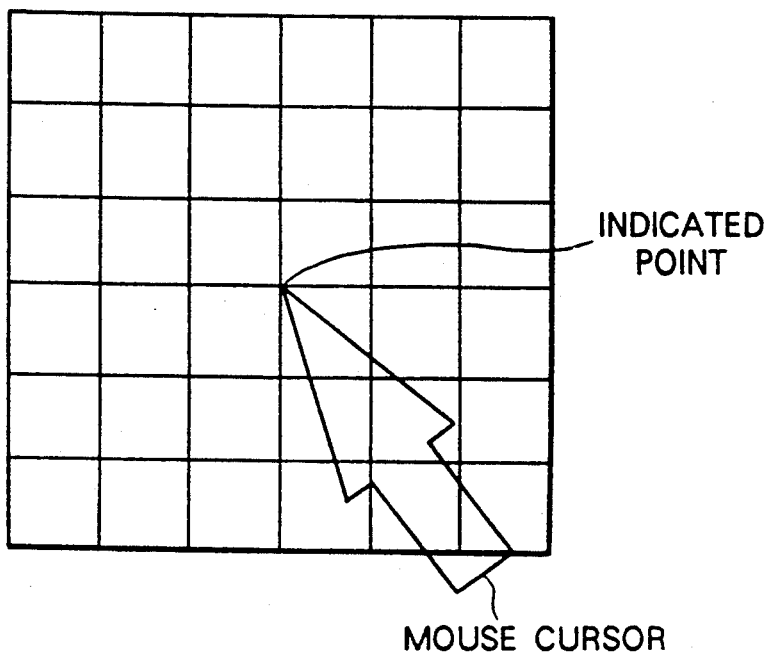
FIG. 7 is an explanatory diagram showing a rule map in the second embodiment.
FIG. 8 is a diagram for illustrating a rule map in the second embodiment.
Figure 9:
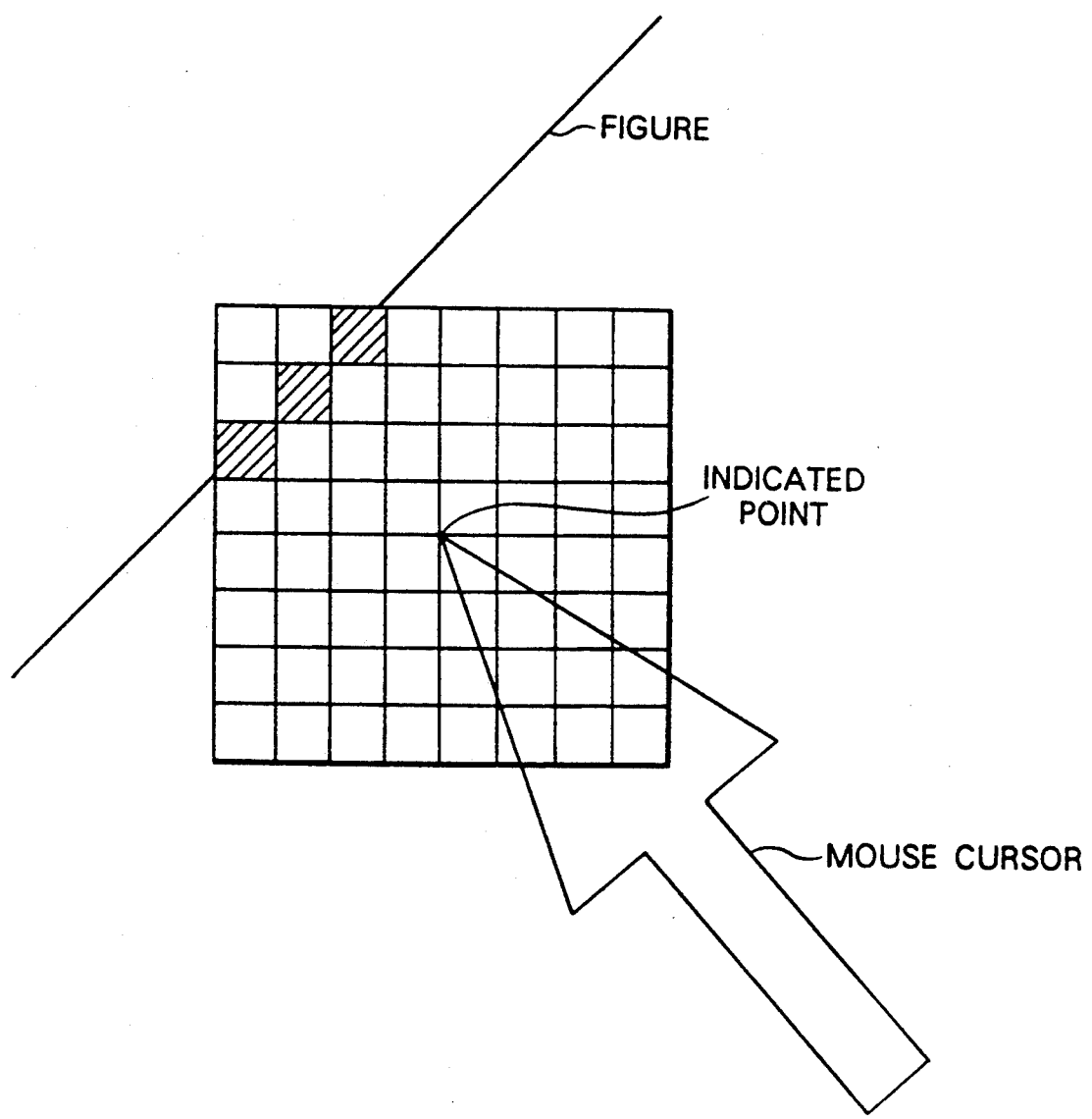
FIG. 9 is an explanatory diagram showing a processing state of the second embodiment.

The operation of the second embodiment will be explained with reference to the flow chart shown in FIG. 5. In step C1, the coordinates detecting means 5 detects the coordinates of a point indicated by a mouse cursor or the like. Next, in step C2, the rule map generating means 11 determines a rule map according to the shape of the mouse. In this case, the rule map generating means 11 generates election possibility information (numeral values between 0 to 1) from the held fuzzy rules. A lattice frame with the indicated point as the center is set as shown in FIG. 7. Here, it is assumed that an individual lattice element corresponds to a dot on the figure display image plane. A fuzzy inference is drawn for every dot so as to determine the possibility to elect the dot (numeric values between 0 and 1) by composing the results of inference. FIG. 8 shows an example of the result of computation. This computation has two advantages - that the same fuzzy rule can be utilized as it is in any figure processing device because it is sufficient to perform computation adapting to the resolution of an image plane of a work station or the like in which the figure electing device of the present invention is incorporated, and that high speed operation can achieved at by computation in advance to eliminate repeated execution of fuzzy inference, which would take a long time every time a figure is elected. The rule map holding means 12 may hold the shape of the mouse cursor and the rule map as a pair in advance. The operation up to this point need not be performed every time a figure is elected, but it is sufficient to perform computations only when fuzzy rules are changed. Here, returning to step C3, FIG. 9 is an explanatory diagram showing the detection of a figure in accordance with the rule map. In step C4, the operation of the present device is ended as it is if no figure is detected. On the other hand, if figures exist, referring to probability values on the rule map corresponding to respective dots of the figure detected by the figure determining means 7, the figure including the dot having the highest possibility to be elected among those dots is provided to the figure processing device 8 as the figure elected by the present device in steps C5 and C6.

As described above, according to the present embodiment, user expectations caused by the shape of a mouse cursor or the like are anticipated on the rule map, thereby to realize accurate figure election.

Figure 10:
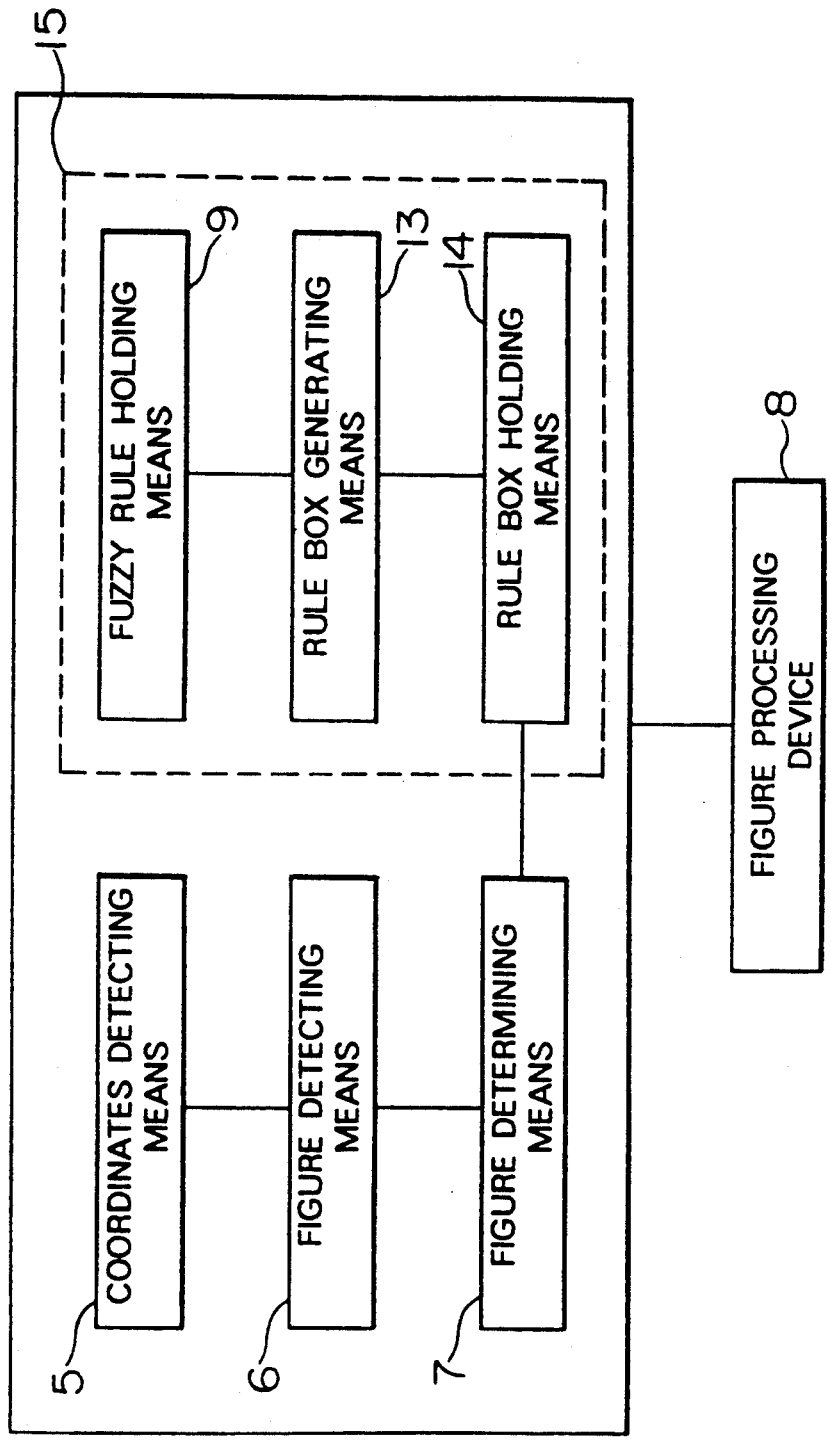
FIG. 10 is a block diagram showing in accordance with a third embodiment of a figure electing device in accordance with the present invention.
Figure 12:
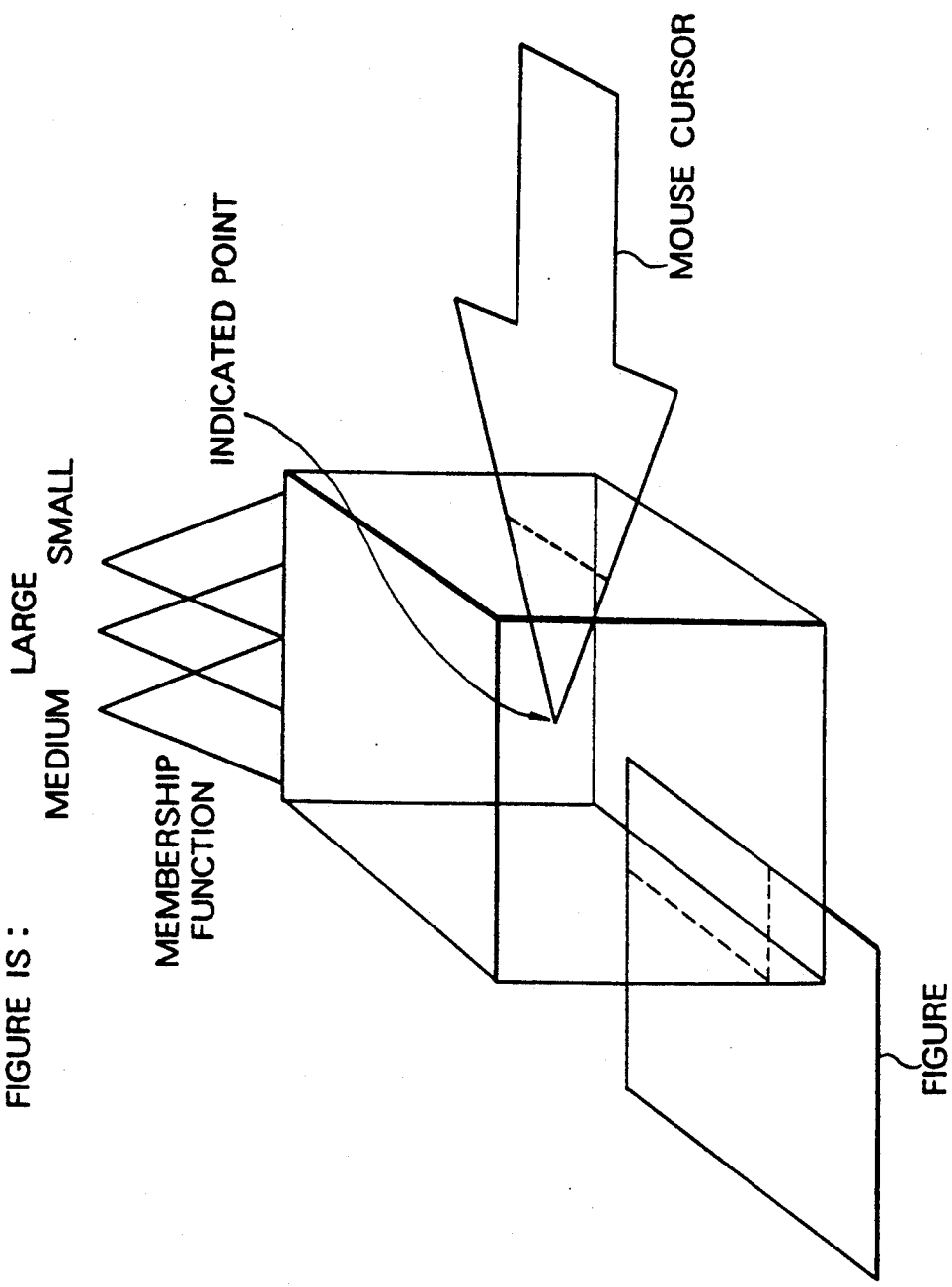
FIG. 12 is an explanatory diagram showing fuzzy rules in the third embodiment.
Figure 13:
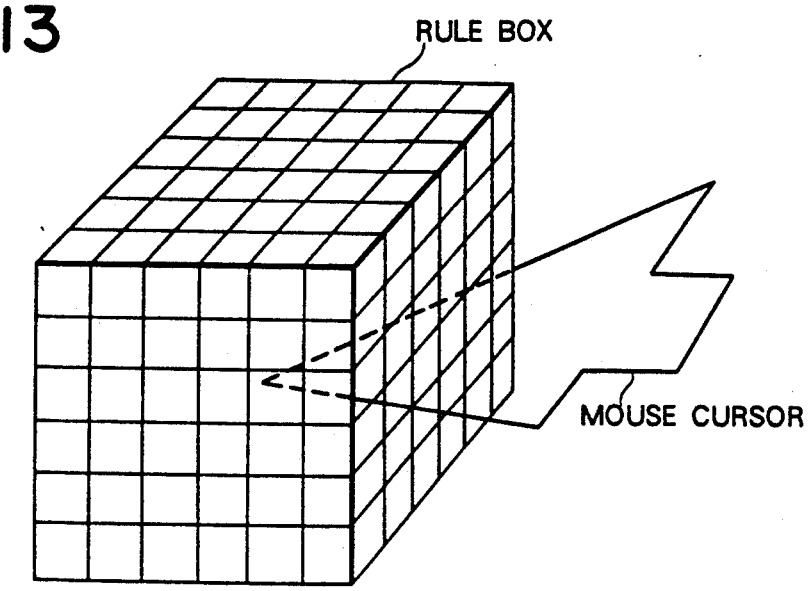
FIG. 13 is an explanatory diagram showing a rule box in the third embodiment.
Figure 14:
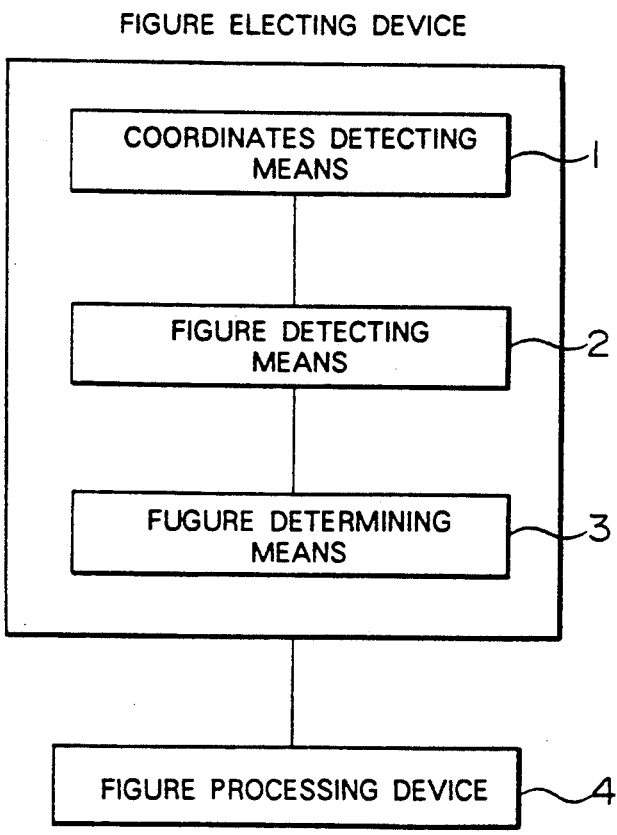
FIG. 14 is a block diagram showing conventional figure electing device.
Figure 15:
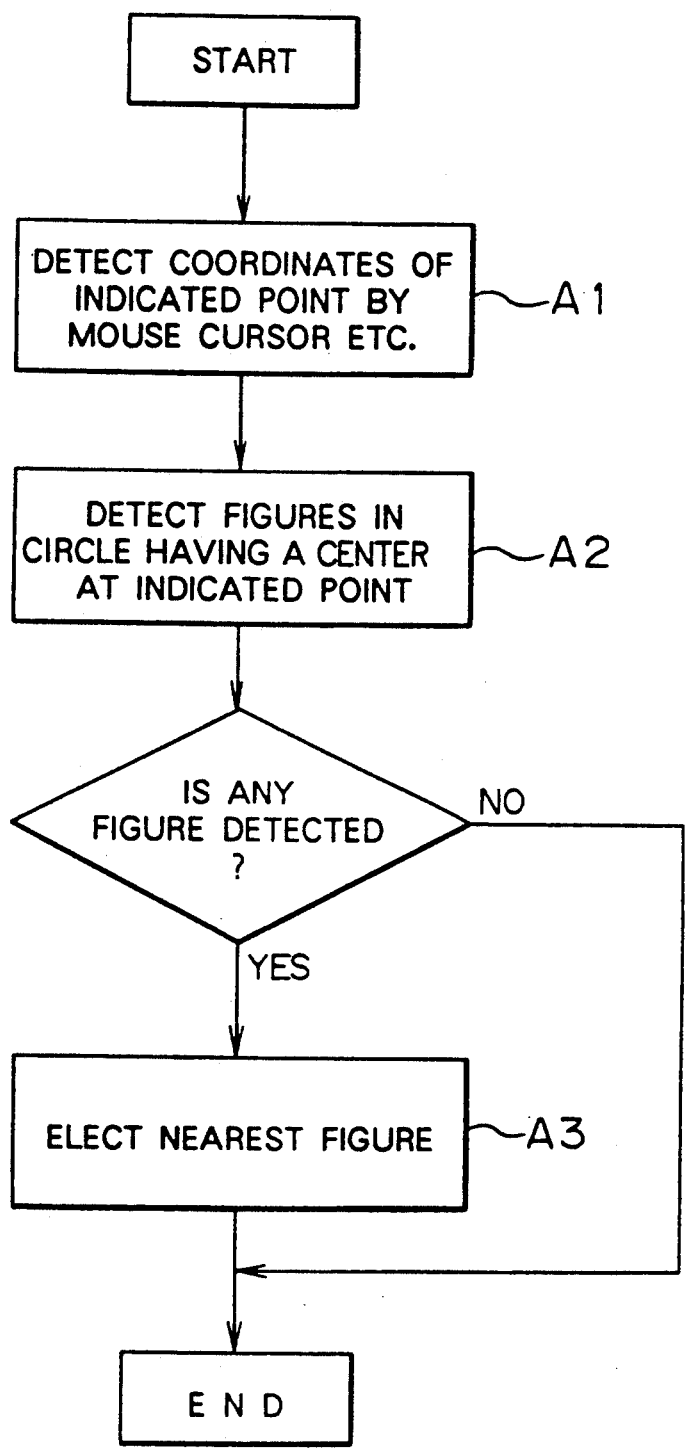
FIG. 15 is a flow chart showing the operation of the conventional example illustrated in FIG. 14.
Figure 16:
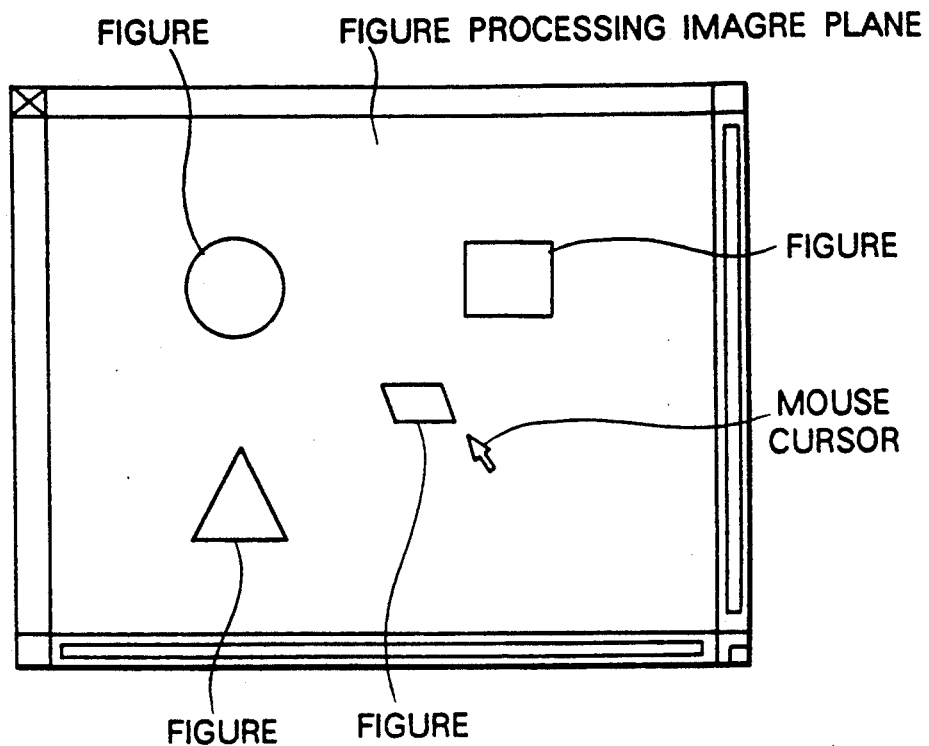
FIG. 16 is a diagram showing a figure processing image plane in the conventional example illustrated in FIG. 14.
Figure 17:
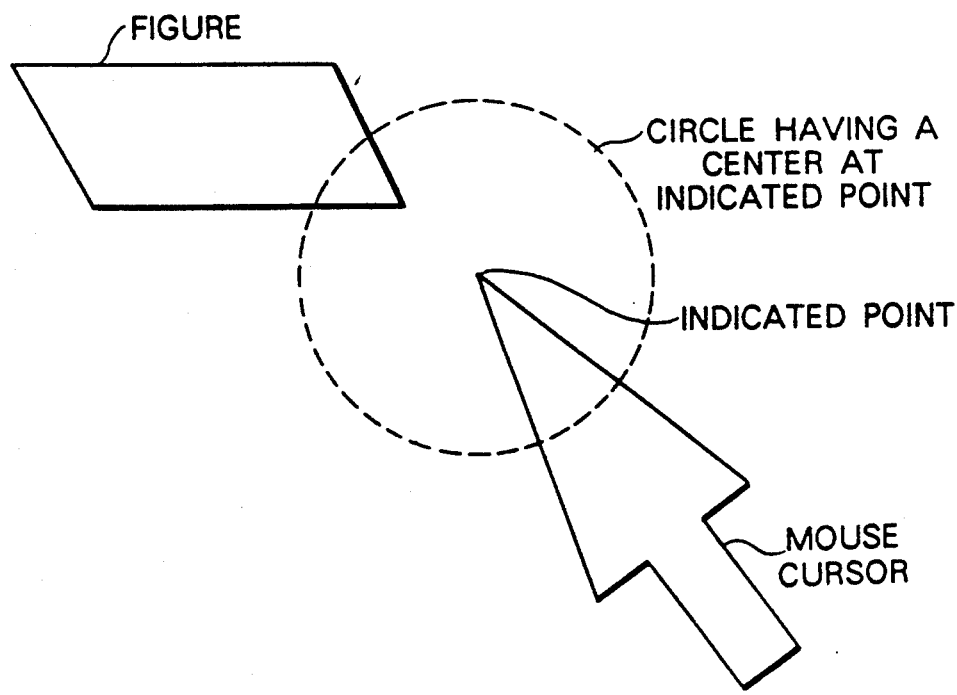
FIG. 17 is a diagram showing the vicinity of a mouse cursor in FIG. 16 on an enlarged scale.
Figure 19:
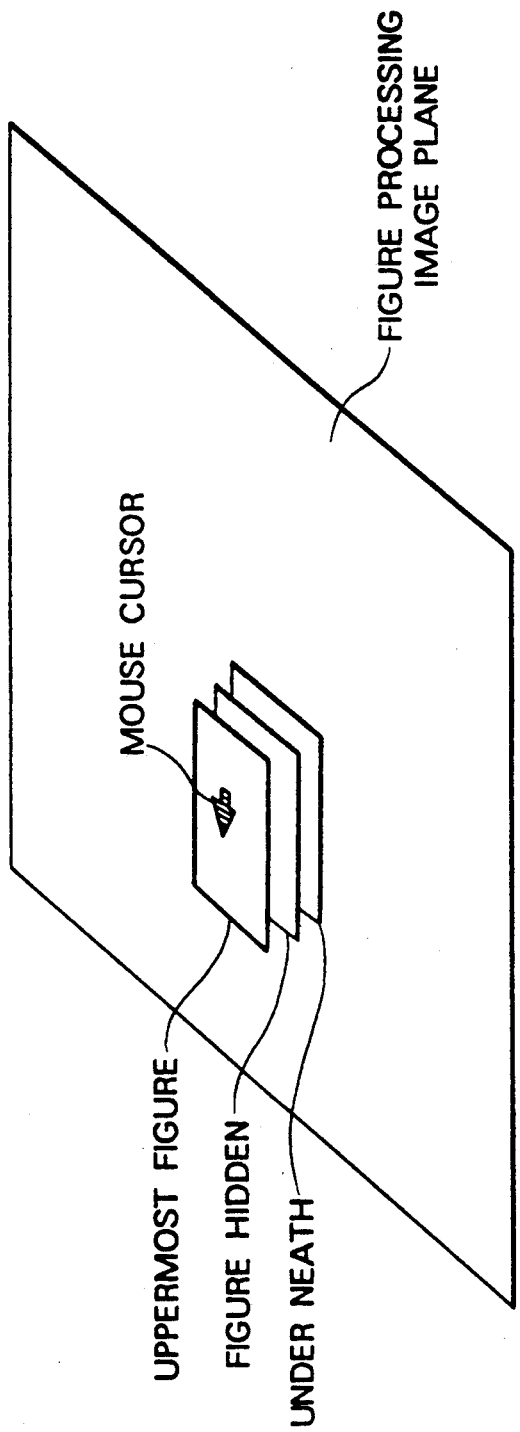
FIG. 19 is an explanatory diagram for explaining overlapping figures on the figure processing image plane.

FIG. 10 is a block diagram showing another embodiment of a figure electing device according to the present invention. In FIG. 10, reference numerals 5 to 9 represent components that are the same as in the first embodiment, and the description thereof is omitted herein. Reference numeral 13 represents a rule box generating means which is connected to the fuzzy rule holding means 9 and rule box holding means 14 and which converts fuzzy rules held by the fuzzy rule holding means 9 into possibilities (numeric values between 0 and 1) for electing respective relative positions. In other words, the rule box generating means 13 draws fuzzy inferences in accordance with the fuzzy rules for each lattice element of a cube having a center at the indicated point as shown in FIG. 13, and determines the possibility (a numeric value between 0 and 1) to elect a dot in a figure corresponding to the lattice element by composing the results of fuzzy inference. Reference numeral 14 represents a rule box holding means for holding the shape of the mouse cursor and a rule box with respect to the number of layers of overlapping figures as a pair. The fuzzy rule holding means 9 holds several fuzzy rules in a form of "if-then~" with respect to the positional relationship with the point indicated by the mouse cursor as shown in FIG. 12. In particular, it is also possible to elect a figure hidden underneath preferentially by holding rules with respect to a plurality of overlapping figures as shown in FIG. 19.

Figure 11:
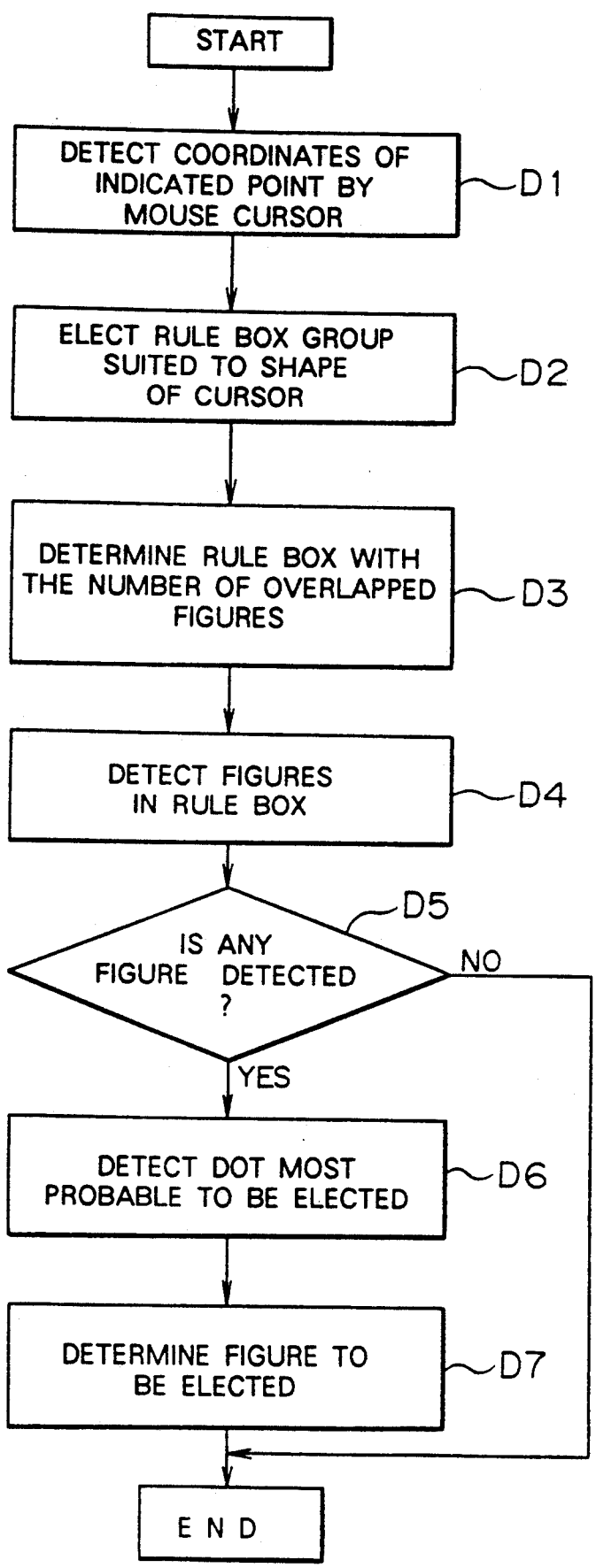
FIG. 11 is a flow chart showing the operation of the third embodiment.

The operation of the third embodiment will be described hereunder. FIG. 11 is a flow chart showing the operation of the present embodiment. In step D1, the coordinates detecting means 5 detects three-dimensional coordinates composed of an image plane where the point indicated by the mouse cursor is located and a two-dimensional position in the image plane. Next, a rule box group that is suited to the shape of the mouse cursor is determined in step D2, and a rule box that is suited to the number of overlapping image planes is determined in step D3. Such determination is made by referring to rule box holding means 14, holding the shape of the mouse cursor and the rule box with respect to the number of overlapping image planes as a pair. In step D4, the figure detecting means 6 detects all the figures located in the rule box. If no figures are detected in step D5, the operation of the present device is ended as it is. If any figure is detected in step D5, the figure determining means 7 refers to the corresponding value of the rule box for every dot of the detected figure, and provides the figure which includes the dot having the highest possibility to be elected from among the dots to the figure processing device 8 as the figure elected by the present device in steps D6 and D7. Thus, according to the above-described embodiment, not only are the expectations of the user caused by the shape of the mouse cursor anticipated, but also the priority of overlapping figures is taken into consideration, thus making it possible to perform an accurate figure election.

As is apparent from the above-described embodiments, the present invention makes it is possible to perform accurate figure election suited to the purpose of a user by providing one of the determination assisting means for drawing fuzzy inferences based on fuzzy rules and computing the possibility to elect every detected figure, rule map generating means for drawing fuzzy inferences in accordance with fuzzy rules so as to generate a rule map, and rule box generating means for drawing fuzzy inferences in accordance with fuzzy rules so as to generate a rule box, making it possible to anticipate the expectations of the user caused by the shape of the mouse cursor so as to perform an accurate figure election. It is also possible to anticipate expectations of the user caused by the shape of the mouse cursor so as to perform an accurate figure election while taking the priority of overlapping figures into consideration.

We claim:

1. A figure electing device for designating an elected figure which is elected by a pointer from among figures displayed in a figure display image plane, said pointer setting an indicating point in said figure display image plane and providing point information concerning said indicating point, said device comprising:

coordinates detecting means for receiving said point information and computing and providing coordinates of said indicating point;

figure detecting means for receiving said coordinates, detecting figures located in the vicinity of said indicating point, and providing figure information on individual detected figures;

figure determining means for receiving said figure information, determining said elected figure relying on said figure information, and providing election information concerning a figure that has been determined to be said elected figure; and criteria providing means for holding and providing possibility information for election of a figure which is located at a relative position with respect to said indicating point, said possibility information being calculated by fuzzy inference based on fuzzy rules used in determining one figure among vicinal figures, wherein, if said figure detecting means detects plural figures, said figure determining means receives possibility information for each of said plural figures and determines said elected figure from among said plural figures on the basis of which of said plural figures is located at a relative position having the most probable possibility of being elected.

2. A figure electing device according to claim 1, wherein said criteria providing means comprises:

a fuzzy rule holding means for accessably holding fuzzy rules for determining a figure; and determination assisting means for referring to said fuzzy rules held by said fuzzy rule holding means and computing by fuzzy inference and providing said possibility information for election of a figure which is located at a relative position to said indicating point.

3. A figure electing device according to claim 1, wherein said criteria providing means comprises:

fuzzy rule holding means for accessably holding fuzzy rules for determining a figure;

rule map generating means for referring to fuzzy rules held by said fuzzy rule holding means and computing by fuzzy inference said possibility information for election of a figure with respect to a two-dimensional relative position to said indicated point, and providing a rule map with the possibility information; and rule map holding means for receiving and accessably holding said rule map.

4. A figure electing device according to claim 3, wherein:

said rule map generating means generates a rule map according to a plurality of different types of pointers;

said rule map holding means accessibly records said rule map associated with each type of pointer; and if said figure detecting means detects plural figures, said figure determining means receives information on the type of pointer used for election, refers to said rule map, and determines a figure located at a position allocated with the highest possibility to be said elected figure.

5. A figure electing device according to claim 1, wherein said criteria providing means comprises:

fuzzy rule holding means for accessably holding fuzzy rules for determining a figure;

rule box generating means for referring to said fuzzy rules held by said fuzzy rule holding means, and generating and providing a rule box having three-dimensional information by computing by fuzzy inference said possibility information for election of a figure with respect to a three-dimensional relative position to said indicated point; and rule box holding means for accessably holding said rule box.

6. A figure electing device according to claim 5, wherein:

said rule box generating means generates a rule box corresponding to a plurality of different types of pointers;

said rule box holding means accessibly records said rule box associated with each type of pointer; and if said figure detecting means detects plural figures, said figure determining means receives information on the type of pointer used for election, refers to said rule box, and determines a figure located at a position allocated with the highest possibility as said elected figure.

7. A figure election device for electing a figure displayed on a figure display image plane which additionally displays a movable pointer, the pointer having a pointing direction and establishing an indicating point which lies along the pointing direction, said figure election device comprising:

coordinates detecting means for determining coordinates of the indicating point;

figure detecting means for receiving the coordinates of the indicating point and detecting figures located in the vicinity of the indicating point, each of the detected figures having a probability of being the elected figure;

means for ascertaining the probability that each of the detected figures is the elected figure on the basis of a plurality of election factors, the election factors including the distance between the indicating point and the detected figures and the positions of the detected figures with respect to the pointing direction; and figure determining means for selecting the detected figure having the highest probability as the elected figure.

8. A figure election device according to claim 7, wherein the means for ascertaining the probability comprises means for determining probabilities by fuzzy inferences based on fuzzy rules.

9. A figure election device according to claim 8, wherein the pointer is an arrow symbol having a triangular head portion, the indicating point being disposed at an apex of the triangular head portion.

10. A figure election device according to claim 8, wherein the pointer is a hand symbol having an extended finger with an outer end, the indicating point being disposed at the outer end of the extended finger.

11. A figure election device according to claim 7, wherein the means for ascertaining the probability comprises means for establishing a lattice of probability regions around the indicating point, each of the probability regions having an associated probability.

12. A finger election device according to claim 7, wherein the means for ascertaining the probability comprises means for establishing a three dimensional array of probability regions around the indicating point, each of the probability regions having an associated probability.

* * * * *